(12) United States Patent
Kerbs

(10) Patent No.: US 8,915,157 B1
(45) Date of Patent: Dec. 23, 2014

(54) NONINTRUSIVE SENSOR CUP FOR COMPOSITE WASTE TANK

(75) Inventor: Bradley Jason Kerbs, Salt Lake City, UT (US)

(73) Assignee: Exelis, Inc., Mclean, VA (US)

( * ) Notice: Subject to any disclaimer, the term of this patent is extended or adjusted under 35 U.S.C. 154(b) by 256 days.

(21) Appl. No.: 13/460,977

(22) Filed: May 1, 2012

Related U.S. Application Data

(60) Provisional application No. 61/528,364, filed on Aug. 29, 2011.

(51) Int. Cl.
  G01D 11/30 (2006.01)
  G01F 23/296 (2006.01)
  G01D 11/24 (2006.01)

(52) U.S. Cl.
  CPC .......... *G01D 11/245* (2013.01); *G01F 23/2961* (2013.01)
  USPC ....................................... 73/866.5; 73/290 V

(58) Field of Classification Search
  CPC . G01D 11/245; G01F 23/282; G01F 23/2845; G01F 23/2961
  See application file for complete search history.

(56) References Cited

U.S. PATENT DOCUMENTS

| 2,404,766 | A | * | 7/1946 | Hanson et al. ................. 285/201 |
| RE33,792 | E | * | 1/1992 | Makinen ...................... 73/866.5 |
| 5,586,085 | A |   | 12/1996 | Lichte |
| 6,631,639 | B1 |   | 10/2003 | Dam et al. |
| 2002/0108670 | A1 |   | 8/2002 | Baker et al. |
| 2009/0142636 | A1 | * | 6/2009 | Handa ............................. 429/26 |
| 2010/0005878 | A1 | * | 1/2010 | Dockendorff et al. ...... 73/290 V |

FOREIGN PATENT DOCUMENTS

| JP | 08145764 | 6/1996 |
| JP | 2001 336967 | 12/2001 |
| JP | 2004 101353 | 4/2004 |
| JP | 2004 101373 | 4/2004 |
| JP | 2004101486 | 4/2004 |
| JP | 2005 262129 | 9/2005 |

* cited by examiner

*Primary Examiner* — Paul West
(74) *Attorney, Agent, or Firm* — Thorpe North & Western LLP

(57) ABSTRACT

A sensor cup has a tube with lateral sides, a distal end with a base coupled to the liner of a tank, and an opposite proximal open end. A composite laminate surrounds a circumference and the lateral sides of the tube. A connection is associated with the tube. A sensor is disposed in the tube and retained therein by the connection. A flange can extend radially outwardly from the cylindrical tube at the distal end with the flange coupled to the liner. The composite laminate can cover the flange with the flange sandwiched between the composite laminate and the liner.

21 Claims, 2 Drawing Sheets

NONINTRUSIVE SENSOR CUP FOR COMPOSITE WASTE TANK

PRIORITY CLAIM

Priority is claimed to U.S. Provisional Patent Application Ser. No. 61/528,364, filed on Aug. 29, 2011; which is herein incorporated by reference.

BACKGROUND

1. Field of the Invention

The present invention relates generally to a non-intrusive sensor within a composite structure. More particularly, the present invention relates to such a sensor for sensing waste matter in an aircraft's waste tank system.

2. Related Art

The vast majority of large containers used to house liquids utilize some form of equipment and technology to determine the level of the fluid contained within. It is quite common to see a mechanical float or some form of an electronic sensor being used to determine the fluid level within a water storage container or fuel tank of a car. The same holds true for the pressurized, composite waste tank of an aircraft. In fact, the sensing system is highly critical within a waste tank in order to notify the pilot and/or flight crew of an aircraft when a tank may be full. The sensing equipment aides in preventing overboard discharge of waste matter which could cause mechanical failures and contamination to other downstream equipment.

Due to the environment contained within the waste tank system, sensing of the waste matter held within tends to be a difficult and often problematic process. The majority of sensing systems used for other liquids has assorted shortcomings within the waste tank environment.

Sensor systems that float on the surface of the fluids will easily foul up with paper particles and waste matter contained within a waste tank.

Load cell sensor systems that measure variations in the weight of the waste tank have difficulties in measuring accurately. This is primarily due to hard point connections all around the tank, like pipes and mechanical attachments that can adversely load or support the weight of the tank.

Pressure sensor systems that measure the difference in hydrostatic pressure (weight) of the fluid can be inaccurate in measuring the volume of fluid in a waste tank in that the contents of the tank (paper products, liquid, and solid matter) vary in density, and thus weight.

Top-down ultrasonic sensor systems in which an ultrasonic signal travels down from the top of tank, bounces off the surface of the fluid, and returns to the sensor receiver does not work well in a waste tank environment. The violent inbound flow of matter from the toilets, movement of the aircraft during flight and turbulence, and cyclic pressure variations of the vacuum waste tank system causes foaming and sloshing of the liquid and waste matter which in turn creates inconsistencies in the sensing signal.

The most common method of determining the full level of a waste tank currently is through point level sensors in which a sensor intrudes through the wall of a tank and senses the full level through direct contact sensing, ultrasonic, or by other means. Although a highly accurate measurement, the intrusive method raises concerns due to the reduction in structural integrity of the tank from the sensor intrusion through the tank wall, the possibility of leakage from the penetration (creating a biohazard), and the possibility of fouling of the sensor from the waste matter.

Existing nonintrusive sensing technology sends a signal (acoustic, ultrasonic, etc.) through the wall of a container and returns it to a receiver. This method does not have to account for variation in density of the waste matter held within the tank. However, this method has proven to be problematic due to the composite laminate commonly used to fabricate the waste tank. The voids (air pockets), variations in resin and fiber volumes, and thickness differences in the composite laminate of the tank wall create large inconsistencies in the sensing signal, and have thus proven to be unreliable.

SUMMARY OF THE INVENTION

It has been recognized that it would be advantageous to develop a sensor and/or a tank in which the sensor can be positioned to sense the level of the tank without interference from the tank itself, or materials forming the tank.

The invention provides a sensor cup in combination with a sensor and a tank with a composite laminate surrounding a liner. The sensor cup includes a cylindrical tube having lateral sides, a distal end with a base coupled to the liner of the tank, and an opposite proximal open end. The composite laminate surrounds a circumference and the lateral sides of the cylindrical tube. A connection is associated with the cylindrical tube. The sensor is disposed in the cylindrical tube and retained therein by the connection.

In accordance with a more detailed aspect of the invention, a flange can extend radially outwardly from the cylindrical tube at the distal end with the flange coupled to the liner. The composite laminate can cover the flange with the flange sandwiched between the composite laminate and the liner.

In accordance with a more detailed aspect of the invention, the distal end of the cylindrical tube can be a closed distal end. The closed distal end and the flange can be attached to an exterior of the liner of the tank.

In accordance with a more detailed aspect of the invention, the distal end of the cylindrical tube can be a closed distal end. The cylindrical tube can extend through an aperture in the liner exposing the closed distal end to an interior of the tank. The flange can be attached to an interior of the liner of the tank.

In accordance with a more detailed aspect of the invention, the distal end of the cylindrical tube can be an open end with a distal opening facing the liner. The sensor can extend through the distal opening in the cylindrical tube and can abut an exterior surface of the liner.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
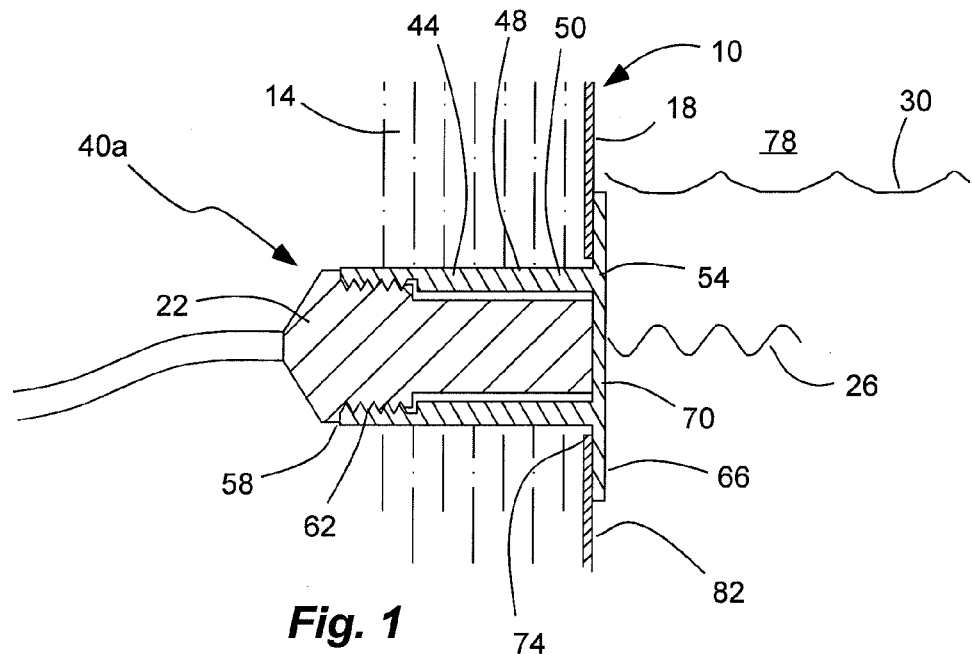
FIG. 1 is a cross-sectional schematic view of a sensor cup device show with a sensor and a tank in accordance with the invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Referring to FIGS. 1-4, a sensor system is shown with a tank 10 or container. The tank can be a composite tank with a composite laminate 14 surrounding a liner 18. The liner 18 can be plastic or metal. The composite laminate 14 can include fibers, such as graphite or fiberglass, in a resin matrix. The tank can be formed by winding a continuous strand or tow of fiber around the liner. The fiber can be pre-preg fiber that is pre-impregnated with the resin. Alternatively, the tank can be formed by laying up plies of the fiber over the liner. The fiber can be pre-preg or the resin can be applied over the plies. The tank can be cylindrical with spherical or dome-shaped ends. The composite laminate and liner can together form a wall of the tank. The tank can be a vacuum waste tank, and can be installed in an aircraft and coupled to a vacuum source, such as a vacuum blower and/or a port to ambient air pressure, and an inlet extending to a toilet. Thus, the vacuum waste tank can be subject to reduced internal pressure from the vacuum source to draw waste through the inlet and into the tank. The sensor system can include a sensor 22, such as a level sensor. The sensor 22 can be electrically coupled to control electronics and/or a computer to provide power and control functions. The sensor 22 can be capable of sending and receiving a signal, such as an acoustic or ultrasonic signal (represented by line 26), and producing a signal representing the received acoustic or ultrasonic wave to the control electronics or computer. Thus, the acoustic or ultrasonic wave from the sensor can be used to determine if the fluid (represented by line 30) is present at the level of the sensor.

The sensor system also includes a sensor cup that can be welded or bonded to the liner 18 of the tank 10. The composite laminate 14 of the wall of the tank can be fabricated around the cup, and thus around the sensor, and therefore not interfere with the nonintrusive sensing of the sensor contents held within the tank. In addition, the sensor cup provides a method and a connection to attach the sensor to the tank, and house the sensor within the sensor cup. The sensor cup can be formed of or can include metal, plastic, or ceramic.

The sensor cup improves the design of the waste tank and/or sensing method. The sensor cup mounts the sensor outside the tank wall so that the sensor is nonintrusive and prevents fouling of the sensor from waste matter. In addition, the sensor cup maintains the structural integrity of the tank due to no intrusion in the tank wall, and prevents leakage of waste matter due to the no penetration. In addition, sensing through the side of the wall provides an accurate measurement similar to point level sensors, and also does not need to account for foaming or density variations of the waste matter within the tank. Furthermore, the sensing system is highly consistent since the sensor signal does not penetrate the laminate and it does not require the nonintrusive sensing to account for the variations in the composite laminate.

Referring the FIG. 1, the sensor cup 40a can have a housing or body with a tube 44, such as a cylindrical tube. The tube can have lateral sides 48, a distal end 50 with a base 54 coupled to the liner 18 of the tank 10, and an opposite proximal open end 58. The composite laminate 14 can surround a circumference and the lateral sides 48 of the tube 44. The sensor disposed in and housed by the cylindrical tube, and retained therein by a connection. The connection can be associated with the tube and the sensor. For example, the connection can include screw threads 62 formed at the proximal end 58 of the tube 44, such as internal female threads on the interior of the tube, and on the sensor 22, such as exterior male threads on the exterior of the sensor. Thus, the sensor can be secured in the tube by inserting the sensor into the tube and turning the sensor so that the threads engage. Alternatively, male screw threads can be formed on the exterior of the proximal end of the tube, and internal female threads can be formed on a cap of the sensor. As another example, the connection can include a clamp, such as a V-band clamp, a clip, a pin, a press or interference fit, a c-ring, etc.

The sensor cup 40a can further include a flange 66 extending radially outwardly from the cylindrical tube 44 at the distal end 50. Thus, the flange 66 can extend beyond the lateral sides 48 of the tube. The flange 66 can be annular and can circumscribe a longitudinal axis of the cylindrical tube 44. The flange 66 can be coupled to the liner 18 of the tank.

The distal end 50 of the cylindrical tube 44 can be closed and can be a closed distal end 70. The sensor 22 can abut to the distal end or interior of the closed distal end 70 of the cylindrical tube 44. In addition, the cylindrical tube 44 can extend through an aperture 74 in the liner 18, exposing the closed distal end 70 to an interior 78 of the tank. In addition, the sensor or face thereof can extend to a location coplanar with the interior surface of the liner. Thus, the flange 66 is attached to an interior 82 of the liner 18 of the tank. The sensor cup and the flange can span and/or overlap the aperture in the liner.

As described above, the sensor cup can be formed of metal, plastic or ceramic. For example, the sensor cup can be plastic and formed by injection molding.

Figure 2:
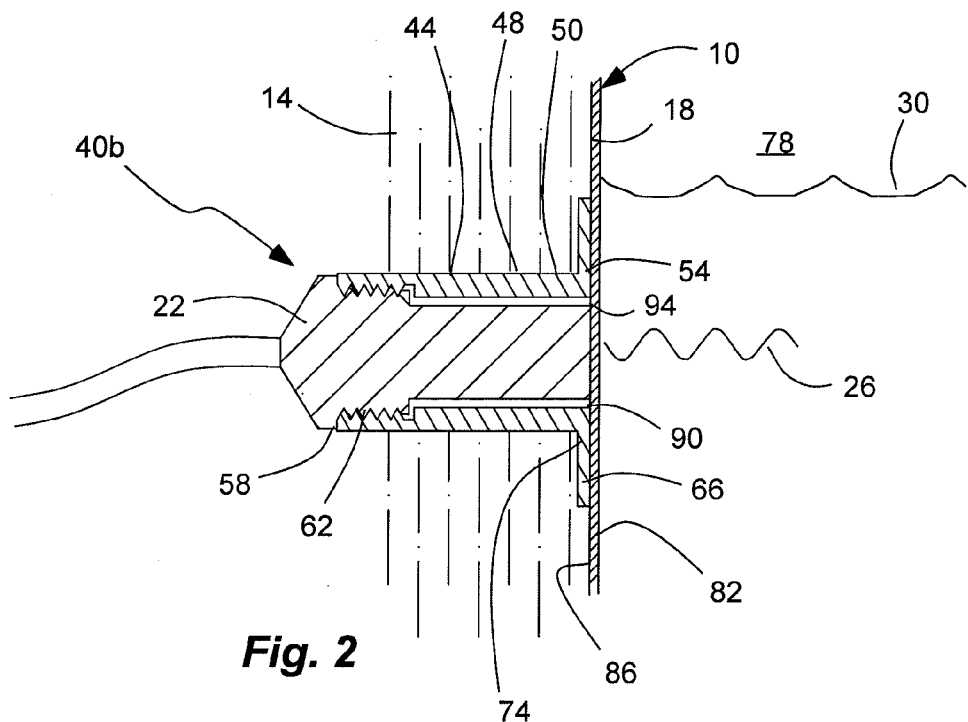
FIG. 2 is a cross-sectional schematic view of another sensor cup device shown with the sensor and the tank in accordance with the invention.

Referring to FIG. 2, another sensor cup 40b and sensor system are shown that are similar in many respects to that described above, and which description is herein incorporated by reference. The sensor cup 40b also has a flange 66 that is attached to an exterior surface 86 of the liner 18 of the tank. In addition, the composite laminate 14 covers the flange 66 and the flange is sandwiched between the composite laminate and the liner.

The distal end 50 of the cylindrical tube 44 can be open and can be an open distal end 90 with a distal opening 94 facing the liner 18 or exterior surface thereof. The sensor 22 can extend through the distal opening 94 in the cylindrical tube 44, and can abut an exterior surface 86 of the liner 18. The distal end 50 and closed distal end 70 of the cylindrical tube 44 can be attached directly to the liner 18.

Figure 3:
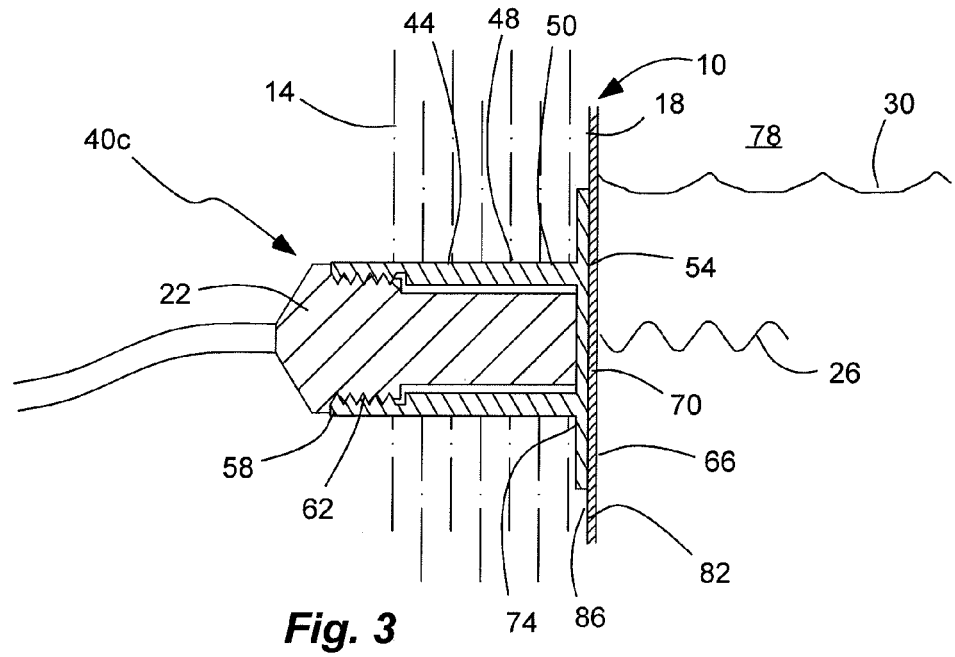
FIG. 3 is a cross-sectional schematic view of another sensor cup device shown with the sensor and the tank in accordance with the invention.

Referring to FIG. 3, another sensor cup 40c and sensor system are shown that are similar in many respects to those described above, and which descriptions are herein incorporated by reference. The sensor cup 40c also has a flange 66 that is attached to an exterior surface 86 of the liner 18 of the tank. In addition, the composite laminate 14 covers the flange 66 and the flange is sandwiched between the composite laminate and the liner.

The distal end 50 of the cylindrical tube 44 can be closed and can be a closed distal end 70. The closed distal end 70 and the flange 66 can be attached to an exterior 86 of the liner 18 of the tank. The distal end 50 and closed distal end 70 of the cylindrical tube 44 can be attached directly to the liner 18.

Figure 4:
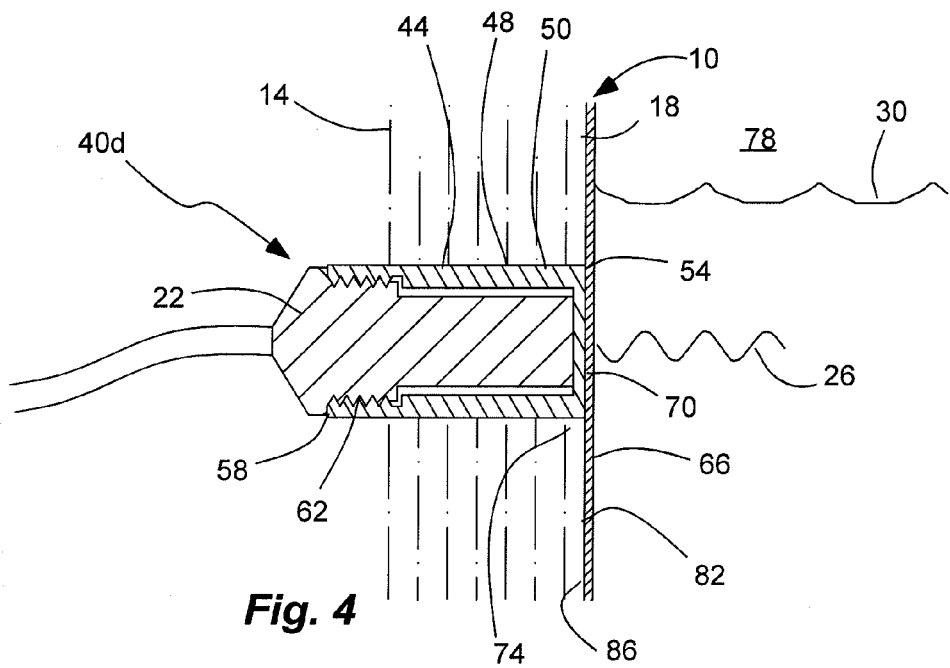
FIG. 4 is a cross-sectional schematic view of another sensor cup device shown with the sensor and the tank in accordance with the invention.

Referring to FIG. 4, another sensor cup 40d and sensor system are shown that are similar in many respects to those described above, and which descriptions are herein incorporated by reference. The sensor cup 40d does not have a flange, but the composite laminate 14 surrounds the circumference and lateral sides 48 of the cylindrical tube 44. The distal end 50 of the cylindrical tube 44 can be closed and can be a closed distal end 70. The closed distal end 70 and the flange 66 can be attached to an exterior 86 of the liner 18 of the tank. The distal end 50 and closed distal end 70 of the cylindrical tube 44 can be attached directly to the liner 18.

In all of the sensor systems and sensor cups described above, the sensor 22 faces the distal end 50 of the cylindrical tube 44, and is oriented to direct a signal 26 through a closed distal end 70 of the tube, or the liner 18, or both, without directing the signal through the composite laminate 14. The acoustic or ultrasonic signal from the sensor passes through the base of the tube, or through the closed distal end, and/or through the liner in order to detect if the fluid 30 contained therein is present at the level of the sensor. Accurate measurement is provided without needing to account for density variations in the tank, and does not need to account for variations in composite laminate. The apparatus contains the sensor in such a way that the sensor signal passes through the base of the cup and the tank liner while bypassing the composite laminate of the tank wall. Thus, the invention involves a non-intrusive sensor cup, particularly with respect to a composite structure, such as a vacuum waste tank of an aircraft. Thus, the sensor mounts outside the tank liner, and is non-invasive and does not penetrate the tank liner; and thus prevents fouling of the sensor and maintains the structural integrity of the tank and prevents leakages.

The distal end 50 of the tube 44, with or without the flange 66, and with the closed distal end 70 or open distal end 94, can form a base that can be substantially flat. The sensor cup can be coupled to a cylindrical wall of the tank. Thus, the distal end 50 of the tube can form a base that can have a broad curvature to match that of the cylindrical tank wall. The sensor cup, distal end thereof and/or the flange can be attached to the exterior or interior of the liner by bonding or welding. The composite laminate 14 can then be fabricated around the sensor cup.

The sensor cups and sensor system described above can be used with general commercial and military aircraft vacuum waste systems, and any composite fabricated container used to measure liquids or solids contained within.

Various aspects of waste tanks are found in U.S. Pat. Nos. 5,211,337 and 6,206,943; and U.S. patent application Ser. No. 13/344,199, filed Jan. 5, 2012; which are herein incorporated by reference.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A sensor cup device in combination with a sensor and a tank with a composite laminate surrounding a liner, the device comprising:
  a) a cylindrical tube separate and discrete from the tank and having a closed distal end abutting to and directly coupled to an exterior surface of the liner of the tank, the cylindrical tube having a proximal open end opposite the closed distal end;
  b) the composite laminate surrounding a circumference and lateral sides of the cylindrical tube;
  c) a connection associated with the cylindrical tube; and
  d) the sensor disposed in the cylindrical tube and retained therein by the connection.

2. A device in accordance with claim 1, further comprising:
  a flange extending radially outwardly from the cylindrical tube at the distal end with the flange coupled to the liner; and
  the composite laminate covering the flange with the flange sandwiched between the composite laminate and the liner.

3. A device in accordance with claim 2, wherein:
  the closed distal end and the flange are attached to an exterior of the liner of the tank.

4. A device in accordance with claim 2, wherein the flange is annular and circumscribes a longitudinal axis of the cylindrical tube.

5. A device in accordance with claim 1, wherein the sensor abuts the distal end of the cylindrical tube.

6. A device in accordance with claim 1, wherein the sensor faces the closed distal end of the cylindrical tube and is oriented to direct a signal through the closed distal end of the tube, the liner, or both, without directing the signal through the composite laminate.

7. A device in accordance with claim 1, wherein the liner is plastic or metal; and wherein the composite laminate includes fibers in a resin matrix.

8. A device in accordance with claim 1, wherein the tank is a vacuum waste tank; and wherein the sensor is a level sensor.

9. A device in accordance with claim 1, wherein the connection comprises screw threads formed at the proximal end of the tube and on the sensor.

10. A sensor cup device in combination with a sensor and a tank with a composite laminate surrounding a liner, the device comprising:
  a) a cylindrical tube having lateral sides, a distal end with a base coupled to the liner of the tank, and an opposite proximal open end, the distal end being closed by the liner or by the tube;
  b) a flange extending radially outwardly from the cylindrical tube at the distal end with the flange coupled to the liner; and
  c) the composite laminate surrounding a circumference and the lateral sides of the cylindrical tube;
  d) the composite laminate covering the flange with the flange sandwiched between the composite laminate and the liner;
  e) a connection associated with the cylindrical tube; and
  f) the sensor disposed in the cylindrical tube and retained therein by the connection.

11. A device in accordance with claim 10, wherein:
  the distal end of the cylindrical tube is a closed distal end; and
  the closed distal end and the flange are attached to an exterior of the liner of the tank wherein the liner closes the distal end.

12. A device in accordance with claim 10, further comprising:
  the distal end of the cylindrical tube being an open end with a distal opening facing, and being closed by, the liner.

13. A device in accordance with claim 12, wherein the sensor extends through the distal opening in the cylindrical tube and abuts an exterior surface of the liner.

14. A device in accordance with claim 10, wherein the sensor faces the distal end of the cylindrical tube and is oriented to direct a signal through a closed distal end of the tube, the liner, or both, without directing the signal through the composite laminate.

15. A device in accordance with claim 10, wherein the tank is a vacuum waste tank; and wherein the sensor is a level sensor.

16. A sensor cup device in combination with a sensor and a tank with a composite laminate surrounding a liner, the device comprising:

a) a cylindrical tube having a distal end with a base coupled to the liner of the tank, and an opposite proximal open end, the distal end being closed by the tube and being a closed distal end, the cylindrical tube having a proximal open end opposite the distal end;

b) the cylindrical tube extends through an aperture in the liner exposing the closed distal end to an interior of the tank;

c) a flange extending radially outwardly from the cylindrical tube at the distal end with the flange coupled to the liner;

d) the flange being attached to an interior of the liner of the tank;

e) the composite laminate surrounding a circumference and lateral sides of the cylindrical tube;

f) a connection associated with the cylindrical tube; and g) the sensor disposed in the cylindrical tube and retained therein by the connection.

17. A device in accordance with claim 16, wherein a face of the sensor extends to a location co-planar with an interior surface of the tank.

18. A device in accordance with claim 16, wherein the sensor abuts the distal end of the cylindrical tube.

19. A device in accordance with claim 16, wherein the sensor faces the distal end of the cylindrical tube and is oriented to direct a signal through the closed distal end of the tube without directing the signal through the composite laminate.

20. A device in accordance with claim 16, wherein the liner is plastic or metal; and wherein the composite laminate includes fibers in a resin matrix.

21. A device in accordance with claim 16, wherein the tank is a vacuum waste tank; and wherein the sensor is a level sensor.

* * * * *